Jan. 20, 1953 V. J. DUKE 2,626,390
SYNCHRONIZING SYSTEM
Filed July 16, 1946 2 SHEETS—SHEET 1
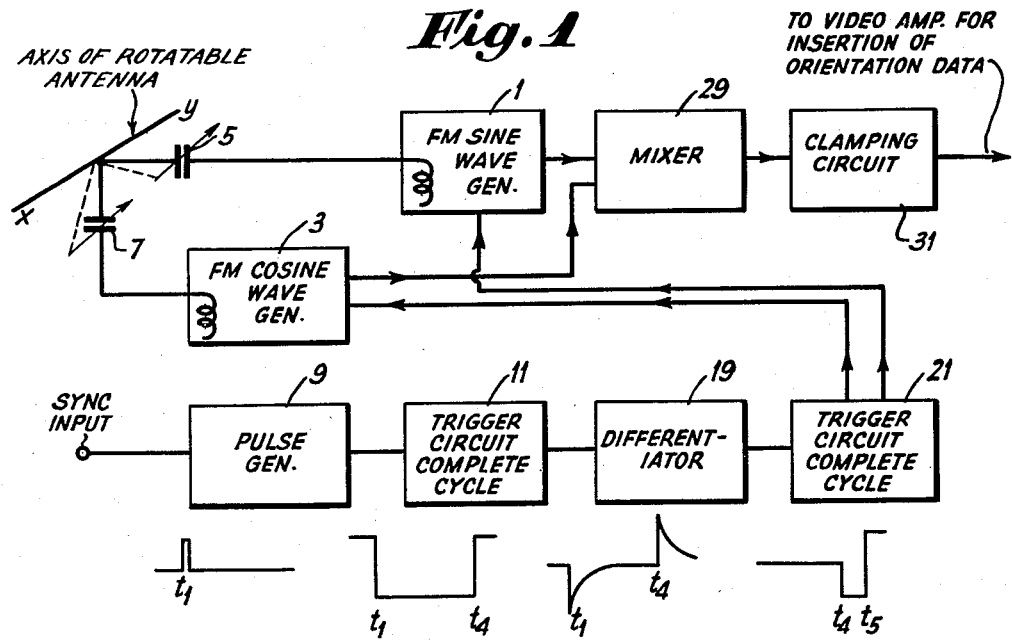
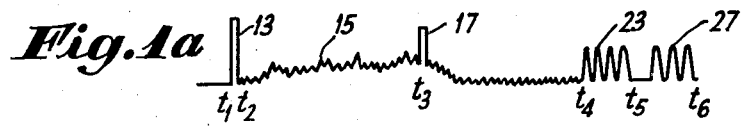
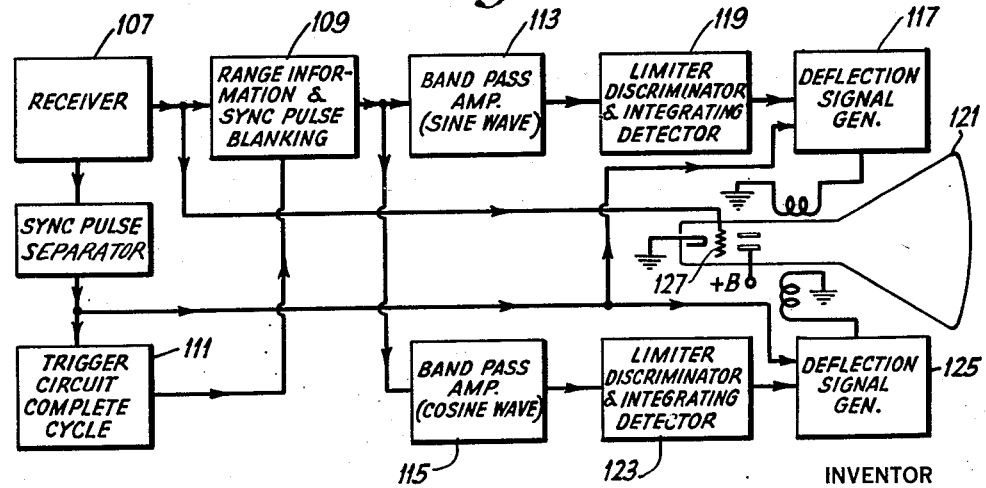
INVENTOR
VERNON J. DUKE
BY
*H. S. Grover.*
ATTORNEY

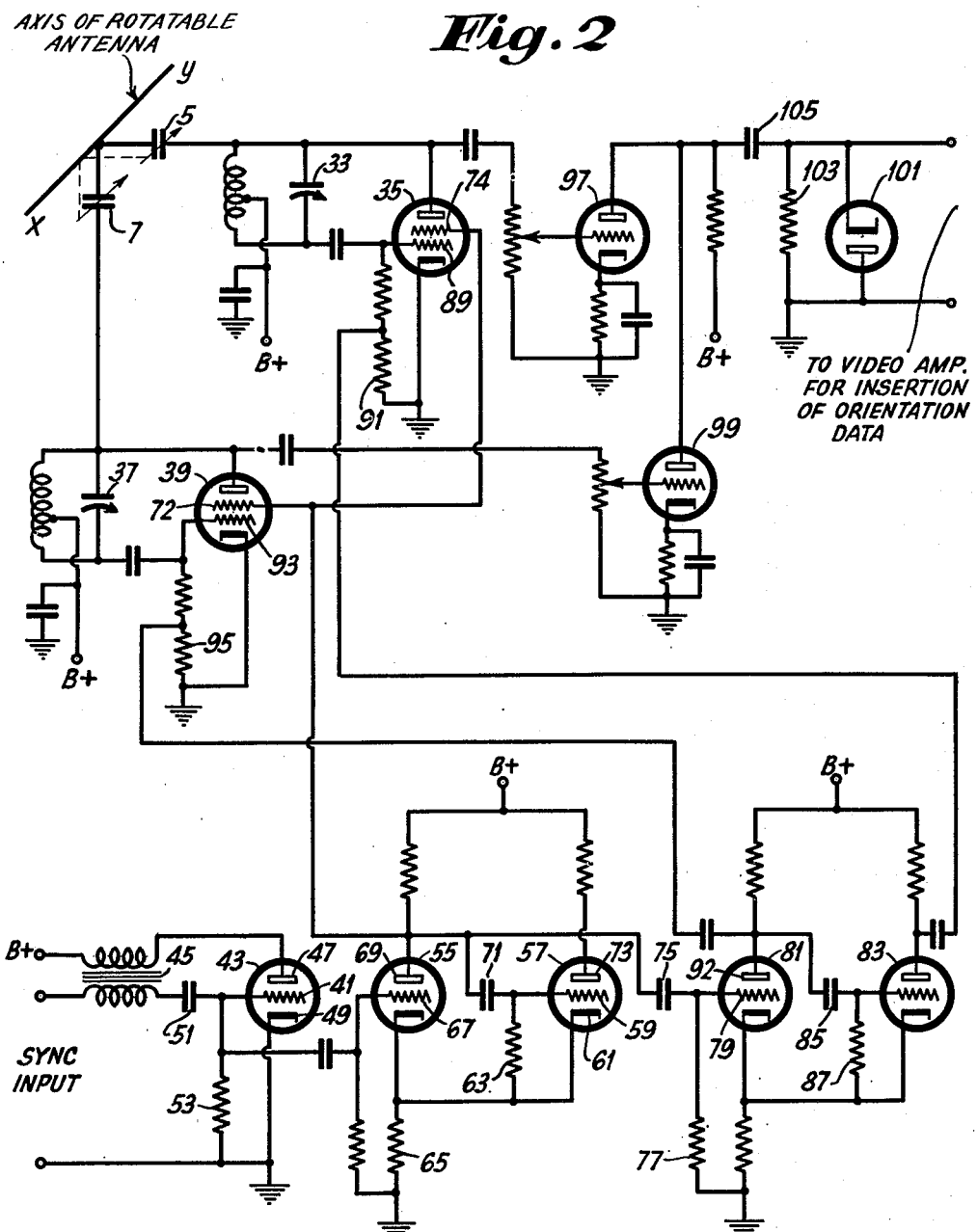

Patented Jan. 20, 1953

2,626,390

UNITED STATES PATENT OFFICE 2,626,390

SYNCHRONIZING SYSTEM

Vernon J. Duke, Rockville Centre, N. Y., assignor to Radio Corporation of America, a corporation of Delaware Application July 16, 1946, Serial No. 684,056

15 Claims. (Cl. 343—6)

This invention relates to synchronizing systems and more particularly to a synchronizing system for a remote cathode ray tube indicating system.

In cathode ray tube systems, it is sometimes desirable to rotate the plane of deflection of the cathode ray beam around the axis of the tube.

The plane of deflection of the cathode ray beam can be rotated about the axis of the tube by mechanically rotating the deflection coils of the tube about the axis. This has been generally unsatisfactory because it is necessary to provide bulky and complicated equipment to mechanically rotate the deflection coils about the tube, and if it is desired to rotate the plane of deflection at a higher rate, the mechanical method becomes very impractical. Synchronism with the transmitted signal can be obtained by reception of the transmitted pulse to mechanically control the rotation. This, however, can be improved upon by the use of an electrode device for rotating the plane of deflection and also providing synchronism.

One satisfactory system is shown and described in Poch Patent No. 2,313,966, dated March 16, 1943. The Poch patent discloses a system wherein the plane of deflection of a cathode ray beam in a cathode ray tube is rotated about the axis of the tube by impressing upon each of the beam deflecting means a sawtooth wave signal whose amplitude varies sinusoidally and wherein the sinusoidal variation on each of the beam deflecting means differs in phase by 90°.

There are applications for a cathode ray tube utilizing a system of deflection wherein the cathode ray beam rotates around the axis of the tube where not only synchronism is required, but a transmission of position information such as the relative direction of the cathode ray beam spot from the center of the tube is also required. The transmission of plan position indication is one example, and for the purpose of explanation of this invention, a typical remote control plan position indicator will be shown and described.

Plan position indication is usually referred to as "P. P. I." P. P. I. presentation consists of a scanning pattern on a kinescope in which the lines are radials emanating from the face center of the tube with a predetermined rotation about the center. This rotation in a broad sense is comparable to the frame sequence in the ordinary rectangular presentation which is used in radio direction and range equipment. The position of the scanning spot on the kinescope face at any instant is the result of the external deflecting forces acting upon the beam. Inasmuch as this beam impinges upon an essentially flat surface, the mathematical positions of the spot can be determined by two coordinated dimensions at right angles to one another and having a common origin. It therefore follows that the position of the beam can also be defined as resulting from two forces at right angles, not only to the beam, but also at right angles to each other.

Inasmuch as the rate of deflection of the beam should most probably be close to constant along a radial and then snapped back to the center more rapidly, a sawtooth type deflection is suggested. The two simple cases of radial deflection occur when only one of the deflecting forces is active and the other dead. If one is termed the horizontal force and the other is the vertical force, it is readily observed that a horizontal line or a vertical line results on the kinescope, as the case may be. If forces act from zero to and equal peak value, it will be seen that the lines will be of equal length. Whether the lines are left or right of center or above or below center is a function of polarity of the force and consequently of the current flowing in the deflecting coils. The general practice involves the production of radials whose sequence cause them to be at any angular position about the center. If the radial is deflected by equal value horizontal and vertical forces in any circular geometric field and each have a peak value of 0.7071 of maximum, the angle of deflection will be at 45° between horizontal and vertical directions.

Inasmuch as the peak values of the deflecting currents must change sinusoidally in order to achieve uniform angular deflection in a round pattern, the conclusion is that the currents flowing in the deflection coils bear a sine-cosine relationship as far as the instantaneous value of the sawtooth wave is concerned.

This invention is particularly applicable to radio direction and range equipment which is commonly known as radar equipment. The principal features of the radar system will be briefly described to indicate how the signals which it is desired to relay differ from those normally encountered in radio communication and television practice.

A burst of high frequency energy is transmitted for an extremely short interval of time. The peak value of the energy may be many thousands of watts. The transmitter is keyed on and off by a pulse recurring at a repetition rate which may be of the order of a thousand cycles per second. The interval of time during which the transmitter is "on" may be of the order of one microsecond. During the remainder of the cycle it is "off," and the antenna system is connected to the receiver.

The radiating antenna is generally a parabolic reflector used with a dipole array located at or near the focal point of the parabola. This antenna system produces a "beam" of elliptical cross section, the major axis being in this case vertical. The entire antenna system is capable of rotation about an axis in the vertical plane. Since speed of rotation of the reflector dipole combination may be of the order of about 30 revolutions per minute, a pulse of high frequency energy is sent out corresponding to about every 10 minutes of angular rotation. This radiated energy travels with the speed of light and, as is well known, when it strikes an object some of it is reflected. This reflected energy is received on the same antenna, and the delay in its arrival following the transmitted pulse can be interpreted as a direct measure of the distance between the transmitter and the object which caused the reflection. The time interval between the transmitted pulse and the reflected signal is a measure of the extent of the object in one direction. Due to the angular rotation of the antenna system, the angular position over which the energy of an echo signal is returned is a direct measure of the direction of the object.

It is common practice to present the above information on the face of the cathode ray tube having a long persistence screen. Such a device is called a plan position indicator or "P. P. I." tube.

A radial scanning system employing a cathode ray beam is shown and described in a patent to Lee de Forest, No. 2,241,809, dated May 13, 1941.

If the cathode ray tube presenting a panoramic view of the area being scanned is to be positioned at a remote location, it is necessary that information regarding the direction of scan or orientation data be transmitted together with the reflection signals in order to reproduce the desired information at a remote position.

According to this invention, the direction of the plane of deflection of the cathode ray beam in a remote beam tube is controlled by the transmission of relative position information by frequency modulation of a sub-carrier signal during sequential intervals of time, the frequency of which is dependent upon the sine and cosine functions of the orientation information.

The primary object of this invention is to provide an improved cathode ray tube indicating system.

Another object of this invention is to provide an improved orientation synchronizing system for a remotely controlled cathode ray tube.

Still another object of the invention is to provide an improved system of plan position indication.

Other and incidental objects of this invention will become apparent to those skilled in the art from a consideration of the accompanying drawings in which:

Figure 1 is a block diagram of the signal transmitting portion of this invention;

Figure 1a illustrates a signal wave obtained in the practice of this invention;

Figure 2 is a circuit diagram of the transmitter portion of this invention; and

Figure 3 is a block diagram of the signal receiving system employed in the practice of this invention.

Figure 1 shows two oscillators which are frequency modulated (FM) by sine waves in angular quadrature. For purposes of this disclosure, generator 1 will be termed the "sine wave" generator, and the generator 3 will be considered the "cosine wave" generator. The signal frequency of frequency modulated sine wave generator 1 is controlled by variable condenser 5 and frequency of frequency modulated cosine wave generator 3 is controlled by variable condenser 7.

Condensers 5 and 7 may be mechanically coupled to the axis $xy$ of an antenna or other device, the orientation information of which it is desired to transmit to a remote position.

Condensers 5 and 7 are spaced 90° from each other in order that both sine and cosine information can be transmitted. It will be seen that if the condensers 5 and 7 are spaced at 90° the position at any one time of the axis $xy$ will cause the capacitive variations of the condensers 5 and 7 to be 90° apart or in quadrature. By proper shaping and design of the plates of condensers 5 and 7, their capacities may be made proportional to their angle of rotation so that the frequency of the associated generator may be made to vary from their predetermined average frequencies as the sine and cosine respectively of angular position.

It is not the intention that this invention should be limited to the use of a condenser mechanically connected to the axis of the antenna for controlling the frequency of the subcarrier oscillator. It may take, for example, the form of a potentiometer or other similar device.

The frequency of the generators 1 and 3 is selected to cover suitable sub-carrier ranges which are different from each other and can be, for example, a frequency range from 1 mc. to 1.1 mc. for sine wave generator 1 and from 1.5 to 1.6 mc. for cosine wave generator 3.

It is not necessary that position information be transmitted continuously in the practice of this invention. It is therefore possible to transmit other intelligence on the same carrier with the orientation information.

In the practice of this invention in one of its preferred forms, each of the generators 1 and 3 is made operative during a relatively small time interval. A synchronizing signal which may be derived from the transmitted burst of energy is applied to a pulse generator 9, which for the purpose of explanation of this invention may take the form of a blocking oscillator impulse generator shown and described in Figure 90, page 155, of "Principles of Television Engineering," by Fink, and which will be explained in more detail below in connection with Figure 2.

In continuing the explanation of this invention, it is desirable to refer briefly to Figure 1a. The signal train starts with a burst of high frequency energy 13 which is of extremely high power. Its duration, as set forth above, is generally about 1 microsecond, and for the purpose of this explanation occurs at time $t_1$. At time $t_2$, a reflected signal 15, which is often described as grass or ground clutter, is received.

At time $t_3$, a reflected pulse 17 is received which is the reflection from an object of the burst of high frequency energy transmitted at time $t_1$. The interval of time $t_1$ to $t_3$ is dependent upon the distance over which the radio frequency signal travelled to reach the object and return.

As has been explained in more detail above, it is not necessary that orientation data be transmitted continuously and therefore we can utilize a portion of the time to transmit this data.

If we assume that a time of approximately 1000 microseconds is allowed between each transmitted burst of high frequency energy, 750 microseconds can be used for presentation of echo signals and 250 microseconds can be used for the transmission of the orientation data.

At time $t_4$, 750 microseconds after each burst of high frequency energy, a signal representing the orientation information can begin. It is therefore necessary to have a circuit which will produce a delay of 750 microseconds from the synchronizing signal. This can be accomplished by the use of a trigger circuit 11, which may take the form of the Eccles-Jordan circuit shown in Figures 4-7, page 173, of "Ultra High Frequency Techniques" by Brainerd, Koehler, Reich, and Woodruff. A detailed explanation of the trigger circuit will be taken up below in connection with Figure 2.

The delayed signal is passed on to the differentiator 19 of Figure 1. The pulse obtained from the differentiator 19 will set off a second trigger circuit designated as 21 of Figure 1 and may be similar to that circuit utilized in 7 with the exception of the timing. The timing of trigger circuit 21 will produce two time intervals of the order of 125 microseconds each. The first time interval of 125 microseconds will cause frequency modulated sine wave generator 1 of Figure 1 to become operative. During the second 125 microsecond period, frequency modulated cosine wave generator 3 of Figure 1 will be made operative.

The first 125 microsecond period is represented in Figure 1a at $t_4$ to $t_5$ and includes the frequency modulated sine wave 23 of generator 1. The second 125 microsecond time interval is illustrated in Figure 1a as time interval $t_5$ to $t_6$ and contains the frequency modulated cosine wave 27 generated by generator 3 of Figure 1.

The output signals of generators 1 and 3 are combined and given the desired amplitude in mixer 29 and transmitted through a clamping circuit 31 to the video amplifier for insertion of orientation data.

Figure 2 shows in detail a circuit diagram which can be used in the practice of a preferred form of this invention. $xy$ denotes the axis of rotation of the antenna system to which have been coupled variable condenser 5, which is connected in parallel with condenser 33 to control the frequency of an oscillator circuit including tube 35.

Condenser 7 is connected in parallel with condenser 37 of an oscillator circuit including tube 39. It will be seen that the frequency of oscillation of each of the oscillator circuits, including tubes 35 and 39, is controlled by the relative position of the transmitting antenna whose axis is designated $xy$.

Referring now to the input circuit marked "sync input" of Figure 2, a portion of sync signal derived from the transmitted burst of high frequency energy is applied to the control electrode 41 of tube 43. Tube 43 is part of a blocking oscillator including a transformer 45.

The action of the blocking oscillator is as follows: When the anode voltage is applied to the tube 43, the circuit begins to oscillate by virtue of the coupling connection between the control electrode 41 and the anode 47 through the transformer 45.

Consider that the oscillation starts with the control electrode 41 at its most negative point. Thereafter the control electrode 41 rapidly becomes more positive as the oscillation starts and the anode current increases. The increase in anode current transferred back to the control electrode circuit through the transformer 45 drives the control electrode 41 still more positive. When the control electrode potential becomes more positive than the cathode, current begins to flow from the cathode 49 to the control electrode 41. This control electrode current quickly charges condenser 51 and the control electrode 41 thereby finds itself with a growing negative charge. This negative charge is accumulated very quickly once the control electrode potential becomes more positive than the cathode 49, and as a result the control electrode 41 cuts off the anode current. The charge on the capacitor 51 is thereupon slowly discharged by the resistor 53. When the capacitor 51 has been sufficiently discharged to allow the control electrode 41 to resume control of the anode current, the oscillation begins again, only to be cut off once more. The result is a succession of sharp pulses in the anode circuit.

In order to have a driven oscillator circuit required in the practice of this invention, it is necessary that the oscillator circuit be highly damped, otherwise the oscillation will not cease quickly enough when the control electrode becomes negatively charged. Also the frequency of oscillation must be high enough so that the duration of each voltage pulse is short when compared with the interval of the incoming synchronizing pulses.

The frequency at which the pulses are generated in a free-running blocking oscillator depends primarily upon the value of the capacity and the resistance in the control electrode circuit. As the control electrode resistance is made smaller, the capacity discharges faster and the blocking action repeats itself at a higher rate. If the resistance and capacity have comparatively high values, the blocking action repeats itself at a low rate.

If the resistance value 53 and the value of the capacity 51 are chosen to produce a pulse at times slightly greater than 1000 microseconds, the incoming synchronizing signal occurring every 1000 microseconds will drive the blocking oscillator to produce a pulse every 1000 microseconds.

This pulse is fed to a trigger circuit which includes tubes 55 and 57.

A trigger circuit will produce a square wave. Even though it is impossible to design a circuit that will pass a perfect square wave without distortion, it is possible to design a circuit that has very little phase distortion and a flat frequency response from a few cycles to several megacycles. Such a circuit will pass the square wave with a very small amount of distortion. The leading and trailing edges of the wave are sloped and rounded so that there is a time of rise and fall. This rise and fall time can be made very small in a properly designed circuit.

Tubes 55 and 57 are combined in such a trigger circuit to provide what is sometimes known as a one-shot mutivibrator. It is a modification of the Eccles-Jordan trigger circuit which accomplishes a complete cycle when triggered with a positive pulse. It is essentially a two-stage resistance coupled amplifier with one tube cut off and the other normally conducting. The balanced condition of the circuit is established by properly biasing the tubes. The control electrode 59 of tube 57 is connected to its cathode 61 through the resistor 63. No current normally flows through this resistor 63, therefore the control electrode bias is normally zero. The anode current of tube 57 flows through the cathode resistor 65 and the resultant voltage drop across resistor 65 biases tube 55 to cut off. When tube 57 is not conducting, tube 55 cannot be cut off by the self-bias developed across resistor 65.

The action of the circuit is as follows: Tube 55 is cut off initially by the voltage drop produced across resistor 65 by the anode current of tube 57. Tube 57 is conducting heavily because its control electrode 59 is at cathode potential.

A positive pulse arriving at control electrode 67 from tube 43 raises the potential of control electrode 67 above the cut off voltage of tube 55, causing tube 55 to conduct, and the voltage at its anode 69 decreases. This decrease in potential passes through capacity 71. As the voltage across the capacitor 71 cannot be changed instantaneously, it appears on the control electrode 59 as a negative-going voltage. The negative-going voltage at control electrode 59 decreases the current flow in tube 57. The corresponding voltage drop in resistor 65 decreases, allowing more current to flow in tube 55. The anode voltage of tube 55 is still further decreased, causing the control electrode 59 to go still more negative.

The action described above is repeated until tube 57 is cut off and tube 55 is conducting. This action is practically instantaneous.

The circuit remains with tube 55 conducting and tube 57 cut off until condenser 71 discharges sufficiently toward the lowered value of anode voltage of tube 55 to allow the control electrode 59 to rise from its lowest value of cut-off voltage. Then tube 57 begins to conduct.

The anode current of tube 57 flowing through resistor 65 raises the cathode voltage of tube 55 and thus reduces its anode current. The decreased anode current of tube 55 allows the anode voltage of tube 55 to increase. This increase is coupled to control electrode 59, increasing still further the anode current of tube 57. Such action is continued until tube 55 is cut off and tube 57 is conducting heavily. This action also is practically instantaneous.

The circuit is now back in its original balanced state and will remain so until another positive pulse arrives and causes tube 55 to conduct.

The length of the time interval during which the potential of anode 69 of tube 55 is low and anode 73 of tube 57 is high is controlled by the time constant of capacity 71 and resistor 63. If large values of resistance and capacity are used, the length of the time interval is increased.

The value of capacity and resistance are so chosen that 750 microseconds will elapse before circuit returns to its original state of stable equilibrium. It follows that a square wave voltage cycle is produced for each pulse applied to the control electrode 67 of tube 55. It will be seen, therefore, that a relatively lower potential will remain on anode 69 of tube 55 for a time duration of 750 microseconds.

This relatively lower potential is applied to electrode 72 of tube 39 and electrode 74 of tube 35. The oscillator circuits including tubes 39 and 35 are so adjusted that they will not oscillate during the interval in which the relatively lower potential is applied to the electrodes 72 and 74.

Tube 57 begins to conduct 750 microseconds after the original pulse and tube 55 stops conducting. The potential of anode 69 therefore rises rapidly relative to its previous state. This rise in potential is transferred to electrodes 72 and 74 and to the differentiating circuit, including capacity 75 and resistor 77.

A typical differentiator circuit is shown. It consists of a capacitance and resistance combination, the capacitance being in series with the signal input and the resistance in shunt across the output circuit.

A differentiator circuit produces an output voltage, the amplitude of which is proportional to the rate of change of the input voltage. In a capacity resistance differentiator circuit the time constant is made short relative to the duration of the applied pulse, in order that the capacitor will become fully charged in a small fraction of the pulse duration. The charge on a capacitor cannot change in value instantaneously, but can change only at the rate established by the product of the resistance and capacity values. This is equivalent to the statement that any sudden change in the voltage of one terminal of a capacitor must occur simultaneously with an equal change in voltage at the other terminal. Since the two circuit components act as a voltage divider network, the portion of the applied voltage which does not appear across the capacitor because of the time required for a change of charge must appear across the resistor as an output voltage.

Upon the application of a synchronizing pulse to control electrode 67, tube 55 becomes conducting and the potential of anode 69 drops almost instantaneously. This action has been explained in more detail above. This instantaneous drop in potential is transferred to the control electrode 79 of tube 81 through the differentiator circuit including the condenser 75, because the potential across condenser 75 will not change immediately.

The charge across condenser 75 leaks off through resistor 77 during the first half cycle of the square wave. At the beginning of the last half cycle of the square wave, the potential at anode 69 rises instantaneously. It will be seen that this instantaneous rise is also transferred to the control electrode 79 and will result in a positive pulse being applied to control electrode 79 at the beginning of the second half cycle of the trigger circuit including tubes 55 and 57.

The circuit including tubes 81 and 83 is a trigger circuit similar to that containing tubes 55 and 57, except that the time constant of the circuit including capacitor 85 and resistance 87 is so adjusted that the trigger circuit containing tubes 81 and 83 will perform half of its cycle in 125 microseconds. Because of the 750 microsecond delay between the sync pulse and the peaked voltage derived from the differentiator, the trigger circuit including tubes 81 and 83 will start its 125 microsecond time interval, 750 microseconds after the sync pulse.

It is necessary to provide a square wave which will perform half of its cycle in 125 microseconds to actuate the oscillators containing tubes 39 and 35 during the time intervals which are allocated to the transmission of the orientation data. It will be seen that if one of the oscillators is controlled by the first half of the square wave cycle and the other oscillator is controlled by the second half of the cycle, a signal train similar to that shown in Figure 1a as 23 and 27 will be produced.

According to the form of this invention illustrated in Figure 2, a relatively positive voltage which starts 750 microseconds after the synchronizing pulse and has a duration of 125 microseconds is taken from tube 83 and applied to the control electrode 89 of sine wave oscillator tube 35 across a resistor 91. Tube 35 is so adjusted that it will not oscillate until such a relatively positive potential is applied to its control electrode 89.

During the second half of the square wave cycle of the trigger circuit containing tubes 81 and 83, anode 92 of tube 81 becomes relatively positive. Tube 39 is controlled by applying this relatively positive potential to its control electrode 93 across resistor 95.

In view of the fact that the square wave generator including tubes 81 and 83 is continuously operative and would continuously control the oscillation of tubes 39 and 35, it is necessary that a voltage be provided to the oscillator circuits during the first 750 microseconds following the sync pulse which will prevent their functioning during that time interval. This is accomplished by properly adjusting the circuit characteristics of oscillator tubes 35 and 39 and connecting electrodes 72 and 74 of tubes 39 and 35 respectively to anode 69 of tube 55. As has been explained above, the potential at anode 69 of tube 55 is relatively lower for the first 750 microseconds following a synchronizing pulse.

The output signals from oscillators 39 and 35 are combined by combining the outputs of tubes 97 and 99, which tubes may also act as gain control amplifiers, as shown.

The mixed signals are then supplied to the video amplifier for insertion of orientation data through a clamp circuit including tube 101, resistor 103, and condenser 105.

A circuit which holds either amplitude extreme of a wave form to a given reference level of potential is called a clamping circuit. The simplest type of clamping circuit utilizes a diode 101 in connection with the ordinary R-C coupling circuit. If the cathode of tube 101 is made negative with respect to the anode, electrons flow from the cathode to anode and the tube constitutes a low resistance. On the other hand, if the cathode is made positive with respect to the anode, the tube may be considered an open circuit.

Upon the application of a signal potential of a positive value, capacity 105 charges gradually through the resistance 103. After a period of time, depending on the R-C time constant, the charge on capacitor 105 reaches the value of the input signal. When the applied voltage is equal to the voltage at which the capacitor 105 is charged, no current flows through resistor 103, and consequently the output voltage is zero.

If the input voltage suddenly changes in a negative direction, the change will be transferred through capacity 105 to the diode 101 which will conduct. This conduction will charge capacity 105 very rapidly, and for all practical purposes will follow the negative change of the input voltage and we can consider the potential across capacitor 105 to equal the input voltage.

As long as the input signal goes in a negative direction or remains at a peak negative value, the output voltage remains at zero.

When the input voltage changes in a positive direction, diode 101 will not conduct and a current will flow in resistor 103 resulting in a rise in voltage in a positive direction across resistor 103. The capacitor 105 will discharge very slowly, as the diode 101 is non-conducting and the high resistance path through resistor 103 must be utilized.

If the input voltage continues to change in a positive direction, it will be seen that the voltage across resistance 103 will continue to increase in a positive direction.

If the input signal oscillates, as it does in this case, it will be seen that the oscillation will be transmitted to the output circuit, but its axis will be shifted such that its peak value in a negative direction will remain at zero or ground potential.

Referring now to Figure 3, receiver 107 is employed for the reception of the transmitted signals including the synchronizing pulses, orientation data, and range information or that type of complete signal which is commonly known as a video signal.

A blanking circuit 109 is timed by trigger circuit 111 to pass signals only during the time interval devoted to orientation data. Blanking circuit 109 may take the form of an amplifier which functions only upon the application of a relatively positive control potential. Such amplifiers are well known in the radio art. The trigger circuit 111 may take the form of the trigger circuit shown in Figure 2 and containing tubes 55 and 57.

The blanking circuit 109 will pass signal energy to the band pass amplifiers 113 and 115 only during that time that the sine and cosine wave generators 1 and 3 of Figure 1 are operative. Band pass amplifier (sine wave) 113 is responsive only to the frequency range of signals over which the frequency modulated sine wave generator 1 of Figure 1 functions. Band pass amplifier (cosine wave) 115 is responsive only to the frequency range of signals over which the frequency modulated cosine wave generator 3 of Figure 1 functions.

The signal obtained from the band pass amplifier (sine wave) 113 is transmitted to the deflection signal generator 117 through the limiter, discriminator and integrating detector 119. The deflection signal generator 117 is well known in the radio art and may take the form illustrated in the patent to Poch, No. 2,313,966, dated March 16, 1943. The limiter, discriminator and integrating detector 119 are also well known to the radio art and may take the form shown and described in detail in chapter 8, page 388 of "Practical Radio Communication" by Nilson and Hornung, second edition.

The function of the limiter, discriminator and integrating detector 119 and the deflection signal generator 117 is to cause the cathode ray beam of the tube 121 to be deflected in one direction, the sine of which is proportional to the frequency of the signal passing the band pass amplifier 113.

The operation of the limiter, discriminator and integrating detector combination can best be explained by a brief reference to the theory of frequency modulation.

Remembering that a frequency modulated wave is constant in amplitude as it leaves the transmitting antenna, any variation in amplitude as received at the receiver must be in the form of extraneous noise and unwanted signal. The function of the limiter stage is to remove all such extraneous amplitude variations before detection.

The function of the discriminator is to demodulate the frequency modulated wave into a signal whose amplitude is representative of the signal which was originally superimposed upon the sub-carrier. The simplest form of circuit which can be used to demodulate a frequency modulated wave is a resonant circuit sufficiently sharp so that the frequency variations detune the circuit on one side of resonance. The variation of voltage in the output circuit is therefore dependent upon the variation in frequency. Improvements in this fundamental circuit for demodulation are well known in the radio art and can be employed in the practice of this invention.

The integrating detector circuit removes the instantaneous variations in the signal voltage in order that a signal truly representative of the original signal and whose amplitude is representative of the orientation of the antenna system will be applied to the deflection signal generator.

The signal passing the band pass amplifier (cosine wave) 115 is applied to the cathode ray tube 121 in a similar manner through a limiter, discriminator and integrating detector 123 and deflection signal generator 125. The direction of deflection resulting from the signal derived from the cosine wave is at right angles to the direction of that obtained from the sine wave of which the cosine will be proportional to the frequency of the signal passing amplifier 115.

In order that the cathode ray beam starts its deflection in synchronism with the transmitted signal, a synchronizing pulse is obtained from the receiver 107 and applied to the deflection signal generator. The manner in which the timing of deflection can be controlled is shown and described in the Poch Patent No. 2,313,966, referred to above.

It will therefore be seen that the orientation of the antenna system which is indicated by the axis $xy$ of Figure 1 will control the direction of deflection of the cathode ray beam in tube 121.

Echo signals are represented by an increased intensity of the cathode ray beam. The intensity of the electron beam in tube 121 is controlled by control electrode 127, which obtains its control signal through receiver 107.

The rate of deflection of the beam radially from the center point of the tube can be adjusted such that the distance of the spot from the center of the tube is representative of the range information. Such procedure is common practice in P. P. I. presentation.

While several systems for carrying this invention in effect have been indicated and described, it will be apparent to one skilled in the art that this invention is by no means limited to the particular organizations shown and described, but that many modifications may be made without departing from the scope of this invention, as set forth in the appended claims.

What is claimed is:

1. In a radio direction and range equipment including a rotatable antenna, a system for transmitting data including range information, antenna orientation data, and cathode ray beam deflection synchronizing pulses to a remote location comprising in combination, two signal generators, the frequencies of one of said signal generators being controlled in accordance with the sine function of the angle of orientation of said antenna from a predetermined reference angle of orientation, and the frequency of the other signal generator controlled with the sine function of the angle from another preterminded reference angle of orientation and whose range of frequencies differ from each other, means connected to both of said signal generators to transmit a signal from each of said generators, said synchronizing pulses, and said range information sequentially, a horizontal deflection generator, a vertical deflection generator, and means for controlling the frequency of said deflection generators with said synchronizing pulses, and means for controlling the amplitude ratio of said deflection generators with the frequency of the output signals of said signal generators.

2. In a radio direction and range equipment of the type including a rotatable antenna, a system for transmitting range information orientation data and synchronizing pulses to a remote location comprising in combination, a first and second signal generators, each of whose frequencies is controlled in accordance with trigonometric functions of the angle of orientation of said antenna from a predetermined reference angle of orientation and whose range of frequencies differ from each other, a trigger circuit connected to said signal generators to make said generators inoperable during the time interval occupied by the transmission of said range information and synchronizing pulses, a first frequency discriminator connected to receive signals from the first of said signal generators, a horizontal deflection generator connected to said first discriminator, a second frequency discriminator connected to receive signals from said second signal generator, a vertical deflection generator connected to said second discriminator, and means for timing said deflection generators with said synchronizing pulses.

3. In a radio direction and range equipment including a rotatable antenna, a system for transmitting range information, synchronizing pulses, and orientated data to a remote point including two signal generators, each of whose frequencies is controlled in accordance with trigonometric functions of the angle of orientation of said antenna from a predetermined reference signal of orientation and whose range of frequencies differ from each other, a trigger circuit timed to function during the interval between synchronizing pulses and a constant predetermined interval of time after each of said synchronizing pulses and connected to said generators to control said generators to operate sequentially only during sequential time intervals, a bandpass filter for each of said range of frequencies, and a horizontal and vertical deflection generator controlled in speed by said synchronizing pulses and in magnitude by the signals of said signal generators.

4. In a radio direction and range equipment including a rotatable antenna, a system for transmitting range information, synchronizing pulses, and orientation data to a remote position including two signal generators, each of whose frequency is governed in accordance with a trigonometric function of the angle of orientation of said antenna from predetermined reference angles of orientation and whose range of frequencies differ from each other, a trigger circuit connected to said signal generators to block the signal of said generators during the time interval occupied by the transmission of said synchronizing pulses and range information, a second trigger circuit timed to function a predetermined interval of time after each of said synchronizing pulses, said second trigger circuit connected to said generators to control the operation of said generators during sequential time intervals, a cathode ray indicating device having an intensity control electrode connected to receive said range information, a first frequency discriminator connected to receive signals from only one of said signal generators, a horizontal deflection generator for said cathode ray indicating device connected to said first discriminator and connected to receive said synchronizing pulses, a second frequency discriminator connected to receive signals from the other signal generator, a vertical deflection generator for said cathode ray indicating device connected to said second discriminator and connected to receive said synchronizing pulses.

5. In radio direction and range equipment of the type including a rotatable antenna, a system for sequentially transmitting range information, synchronizing pulses, and orientation data to a remote point by subcarrier frequencies governed by the orientation of said antenna and whose range of frequencies differ from each other, a receiver comprising a bandpass filter for each of said range of frequencies, a blanking circuit connected to pass signals to said bandpass filters only during different predetermined time intervals, a cathode ray indicating device having an intensity control electrode means for applying said range information to said control electrode, a first frequency discriminator connected to one of said bandpass filters, a second frequency discriminator connected to the other of said bandpass filters, a horizontal deflection generator for said cathode ray indicating device connected to said first discriminator, a vertical deflection generator for said cathode ray indicating device connected to said second discriminator and means for applying said synchronizing pulses to said deflection generators.

6. In a radio direction and range equipment including a rotatable antenna, a system for sequentially transmitting range information, synchronizing pulses, and orientation data to a remote point comprising two signal generators, each of whose frequencies is governed in accordance with a trigonometric function of the angle of orientation of said antenna from predetermined reference angles of orientation and whose range of frequencies differ from each other, means connected to each of said signal generators and adapted to pass a signal from said generators only during different predetermined time intervals, a signal transmission circuit at said remote point controlled by a second trigger circuit to make said signal transmission circuit inoperative during the time interval occupied by the transmission of said range information and synchronizing pulses, a cathode ray indicating device having an intensity control electrode connected to receive said range information, a first frequency discriminator connected to receive signals from only one of said signal generators, a horizontal deflection generator for said cathode ray indicating device connected to said first discriminator and connected to receive said synchronizing pulses, a second frequency discriminator connected to receive signals from the other signal generator, a vertical deflection generator for said cathode ray indicating device connected to said second discriminator and connected to receive said synchronizing pulses.

7. In a radio direction and range equipment including a rotatable antenna, a system for transmitting range information, synchronizing pulses, and orientation data to a remote position comprising two signal generators, each of whose frequencies is governed in accordance with a trigonometric function of the angle of orientation of said antenna from predetermined reference angles of orientation and whose range of frequencies differ from each other, a trigger circuit connected to said signal generators to make said generators inoperative during the time interval occupied by the transmission of said range information and synchronizing pulses, a second trigger circuit timed to function upon the completion of the interval occupied by the transmission of said range information, said second trigger circuit connected to said generators to control the operation of said generators during sequential time intervals, a signal transmission circuit at said remote position controlled by a third trigger circuit to make said signal transmission circuit inoperative during the time interval occupied by the transmission of said range information and synchronizing pulses, a cathode ray indicating device having an intensity control electrode connected to receive said range information, a first frequency discriminator connected to receive signals from only one of said signal generators, a horizontal deflection generator for said cathode ray indicating device connected to said first discriminator and connected to receive said synchronizing pulses, a second frequency discriminator connected to receive signals from the other signal generator, a vertical deflection generator for said cathode ray indicating device connected to said second discriminator and connected to receive said synchronizing pulses.

8. In a radio direction and range equipment including a rotatable antenna, a system for sequentially transmitting range information, synchronizing pulses, and orientation data to a remote position comprising two signal generators, each of whose frequencies is governed in accordance with a trigonometric function of the angle of orientation of said antenna from predetermined reference angles of orientation and whose range of frequencies differ from each other, a trigger circuit connected to said signal generators to make said generators inoperative during the time interval occupied by the transmission of said range information, a differentiator circuit connected to said trigger circuit to derive therefrom a signal pulse at the completion of the time interval allocated to the transmission of range information, a second trigger circuit connected to said differentiator adapted to function upon the application of said signal pulse, said second trigger circuit connected to said generators to control the operation of said generators during sequential time intervals, a signal transmission circuit at said remote position controlled by a third trigger circuit to make said signal transmission circuit inoperative during the time interval occupied by the transmission of said range information and synchronizing pulses, a bandpass filter for each of said range of frequencies connected to said signal transmission circuit, and a deflection signal generator connected to each of said bandpass filters to provide a deflection signal voltage whose frequency is controlled by said synchronizing pulses and whose magnitude is controlled by the frequency of said signal generators.

9. Apparatus for transmitting synchronizing pulses, range information, and orientation data comprising the combination of means for sequentially transmitting a synchronizing pulse, range information, a first subcarrier signal whose frequency is representative of the sine of said orientation data and a second subcarrier signal whose frequency is representative of the cosine of said orientation data and whose range of frequencies differs from the frequency of said first subcarrier signal, means for selecting the range of frequencies of said first subcarrier signal to the exclusion of the range of frequencies of said second subcarrier signal and deriving therefrom a signal representative of the sine of said orientation data means for selecting the range of frequencies of said second subcarrier signal and deriving therefrom a signal representative of the cosine of said orientation data and means for combining said signals to reconstruct said orientation data.

10. Apparatus for transmitting synchronizing pulses, range information, and orientation data comprising the combination of means for sequentially transmitting a synchronizing pulse, range information, a first subcarrier signal whose frequency is representative of a coordinate distance between two points and a second subcarrier signal whose frequency is representative of the other coordinate distance between the said two points, and whose range of frequencies differs from the range of frequencies of said first subcarrier signal, means for selecting the range of frequencies of said first subcarrier signal to the exclusion of the range of frequencies of said second subcarrier signal means for controlling a coordinate distance in an indicating device in accordance with the frequency of said first subcarrier signal, means for selecting the range of frequencies of said second subcarrier signal to the exclusion of the range of frequencies of said first subcarrier signal and means for controlling the other coordinate distance in said indicating device.

11. Apparatus for transmitting synchronizing pulses, range information, and orientation data comprising in combination means for indicating range information by illumination, and sequentially transmitting a synchronizing pulse, range information, a first subcarrier signal whose frequency is representative of a coordinate distance between two points, and a second subcarrier signal whose frequency is representative of the other coordinate distance between the said two points and whose range of frequencies differs from the range of frequencies of said first subcarrier signal, means for blanking said signal during the interval occupied by said range information and synchronizing pulse, means for selecting the range of frequencies of said first subcarrier signal to the exclusion of the range of frequencies of said second subcarrier signal and positioning said illumination in one coordinate in accordance with the frequency of said first subcarrier signal, and means for selecting the range of frequencies of said second subcarrier signal to the exclusion of the range of frequencies of said first subcarrier signal, and positioning said illumination in the other coordinate in accordance with the frequency of said second subcarrier signal.

12. A system for transmitting range information, synchronizing pulses, and orientation data comprising in combination a first subcarrier signal generator whose frequency is representative of a coordinate distance between two points and a second subcarrier signal generator whose frequency is representative of the other coordinate distance between the said two points, and whose tunable range of frequencies differs from the tunable range of frequencies of said first subcarrier signal generator, a first band pass amplifier responsive only to the range of frequencies of said first subcarrier signal generator, an indicating device, a first deflection signal generator connected to said first band pass amplifier to control a coordinate distance in said indicating device in accordance with the frequency of said first subcarrier signal, a second band pass amplifier responsive only to the range of frequencies of said second subcarrier signal generator, and a second signal generator connected to said second band pass amplifier to control the other coordinate distance in said indicating device in accordance with the frequency of said second subcarrier signal.

13. In a radio direction and range equipment of the type including a rotatable antenna, a system for transmitting range information, synchronizing pulses, and orientation data to a remote position by sequentially transmitting range information, cathode ray deflection synchronizing pulses, and sequential frequency modulated subcarrier signals whose frequencies are determined in accordance with trigonometric functions of the angle of orientation of said antenna from a predetermined reference angle of orientation, the combination of a cathode ray indicating device having an intensity control electrode means to apply range information to said control electrode, a first frequency discriminator connected to receive one of said frequency modulated orientation data signals, a synchronizing pulse separator, a horizontal deflection generator for said cathode ray indicating device connected to said first discriminator and connected to said separators to receive said synchronizing pulses, a second frequency discriminator connected to receive the other frequency modulated orientation data signals, a vertical deflection generator for said cathode ray indicating device connected to said second discriminator and connected to said separator to receive said synchronizing pulses.

14. A system for receiving range information, scanning synchronization pulses, and orientation data at a location remote from a transmitter comprising in combination, a cathode ray indicating device having an intensity control electrode, means to apply range information to said control electrode, a synchronizing pulse separator, a first frequency discriminator, a horizontal deflection generator for said cathode ray indicating device connected to said first discriminator and connected to receive deflection synchronizing pulses from said synchronizing pulse separator, a second frequency discriminator, a vertical deflection generator for said cathode ray indicating device connected to said second discriminator and connected to receive deflection synchronizing pulses from said synchronizing pulse separator.

15. A radio direction and range equipment comprising, a rotatable antenna, a system for transmitting range information and synchronizing pulses, means for transmitting orientation data including a first and second signal generators, means to control the frequency of said generators in accordance with a trigonometric function of the angle of orientation of said antenna from a predetermined reference angle of orientation, and wherein the range of frequencies of said signal generators differ from each other, a trigger circuit connected to said signal generators to make said generators inoperative during the time intervals occupied by the transmission of said range information and synchronizing pulses, a signal transmission circuit, a bandpass filter for each of said range of frequencies connected to said signal transmission circuit, a cathode ray indicating device having intensity control electrode connected to receive said range information, a first frequency discriminator connected to receive signals from only one of said bandpass filters, a horizontal deflection generator for said cathode ray indicating device connected to said first discriminator and connected to receive said synchronizing pulses, a second frequency discriminator connected to receive signals from the other of said bandpass filters, a vertical deflection generator for said cathode ray indicating device connected to said second discriminator and connected to receive said synchronizing pulses.

VERNON J. DUKE.

REFERENCES CITED

The following references are of record in the file of this patent:

UNITED STATES PATENTS

| Number | Name | Date |
| --- | --- | --- |
| 2,301,395 | Goldsmith | Nov. 10, 1942 |
| 2,326,515 | Bartelink | Aug. 10, 1943 |
| 2,412,669 | Bedford | Dec. 17, 1946 |
| 2,421,747 | Englehardt | June 10, 1947 |
| 2,426,654 | White | Sept. 2, 1947 |
| 2,433,381 | Marchand | Dec. 30, 1947 |
| 2,435,736 | Carnahan | Feb. 10, 1948 |
| 2,459,481 | Wolff | Jan. 18, 1949 |
| 2,459,482 | Bond | Jan. 18, 1949 |